United States Patent
Kim et al.

(10) Patent No.: US 11,977,619 B2
(45) Date of Patent: May 7, 2024

(54) METHOD AND DEVICE FOR CONTROLLING DEVICE BASED ON VEHICLE VIRTUAL STRUCTURE

(71) Applicant: DRIMAES, INC., Daegu (KR)

(72) Inventors: Yong Kyung Kim, Gyeonggi-do (KR); Woo Jin Han, Seoul (KR); Yevgeny Hong, Seoul (KR); Hyun Duk Choi, Gyeonggi-do (KR)

(73) Assignee: DRIMAES, INC., Daegu (KR)

( * ) Notice: Subject to any disclaimer, the term of this patent is extended or adjusted under 35 U.S.C. 154(b) by 337 days.

(21) Appl. No.: 17/617,067

(22) PCT Filed: Nov. 19, 2021

(86) PCT No.: PCT/KR2021/017039
§ 371 (c)(1),
(2) Date: Dec. 7, 2021

(87) PCT Pub. No.: WO2022/163983
PCT Pub. Date: Aug. 4, 2022

(65) Prior Publication Data
US 2023/0177139 A1    Jun. 8, 2023

(30) Foreign Application Priority Data

Feb. 1, 2021   (KR) .................. 10-2021-0014175

(51) Int. Cl.
*G06F 21/44* (2013.01)
*B60R 16/023* (2006.01)
(Continued)

(52) U.S. Cl.
CPC ............ *G06F 21/44* (2013.01); *B60R 16/023* (2013.01); *G06F 9/45533* (2013.01);
(Continued)

(58) Field of Classification Search
CPC ...... G06F 21/44; G06F 9/45533; G06F 13/10; G06F 2009/45579; G06F 2009/45595; B60R 16/023; H04L 67/12
(Continued)

(56) References Cited

U.S. PATENT DOCUMENTS

2016/0274929 A1*   9/2016   King ................. G06F 9/5072
2020/0117514 A1*   4/2020   Yu .................... G06F 9/5044
(Continued)

FOREIGN PATENT DOCUMENTS

KR        10-0956640         6/2010
KR     10-2011-0138887      12/2011
(Continued)

OTHER PUBLICATIONS

Grounds of Reason of Rejection dated Apr. 26, 2022 From the Korean Intellectual Property Office Re. Application No. 10-2021-0014175. ( 4 Pages).
(Continued)

*Primary Examiner* — Michael S McNally

(57) ABSTRACT

An embodiment discloses a method for controlling a vehicle virtualization structure-based device including the steps of receiving a request for use of a device from at least one container among a plurality of containers; and determining the use of the device according to a type of the device and a type of the container that transmits the request for use.

10 Claims, 7 Drawing Sheets

(51) Int. Cl.
   *G06F 9/455*   (2018.01)
   *G06F 13/10*   (2006.01)
   *H04L 67/12*   (2022.01)

(52) U.S. Cl.
   CPC .... *G06F 13/10* (2013.01); *G06F 2009/45579* (2013.01); *G06F 2009/45595* (2013.01); *H04L 67/12* (2013.01)

(58) Field of Classification Search
   USPC .......................................................... 726/17
   See application file for complete search history.

(56)              References Cited

U.S. PATENT DOCUMENTS

2021/0208951 A1*  7/2021  He ........................ G06F 9/5044
2022/0308910 A1*  9/2022  Rottkamp ............. G06F 13/385

FOREIGN PATENT DOCUMENTS

KR         10-1982164        8/2019
KR      10-2020-0032014      3/2020
KR      10-2020-0042793      1/2022

OTHER PUBLICATIONS

International Search Report dated May 3, 2022 From the International Searching Authority Re. Application No. PCT/KR2021/017039. (3 Pages).

* cited by examiner

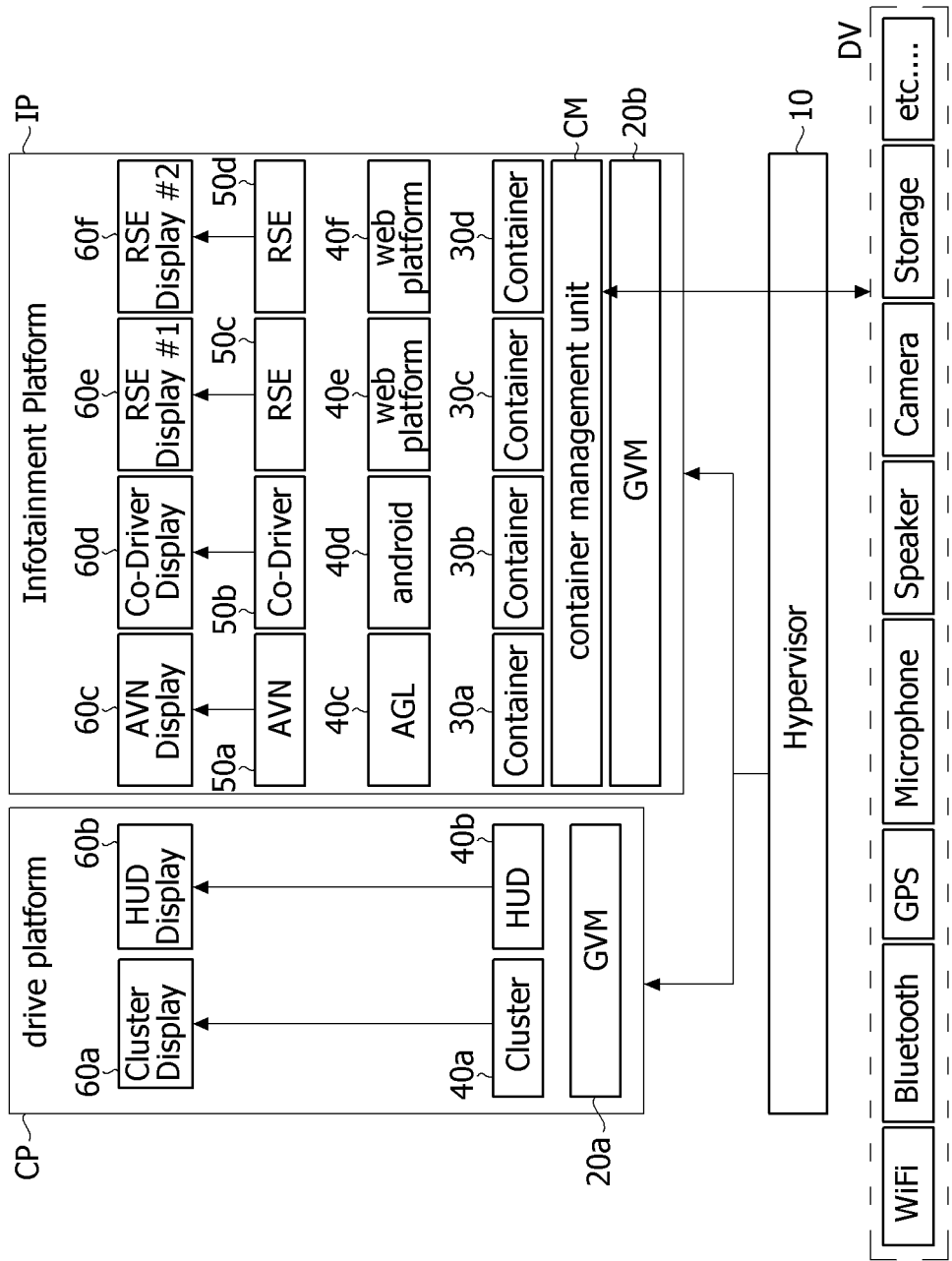
[FIG. 1]

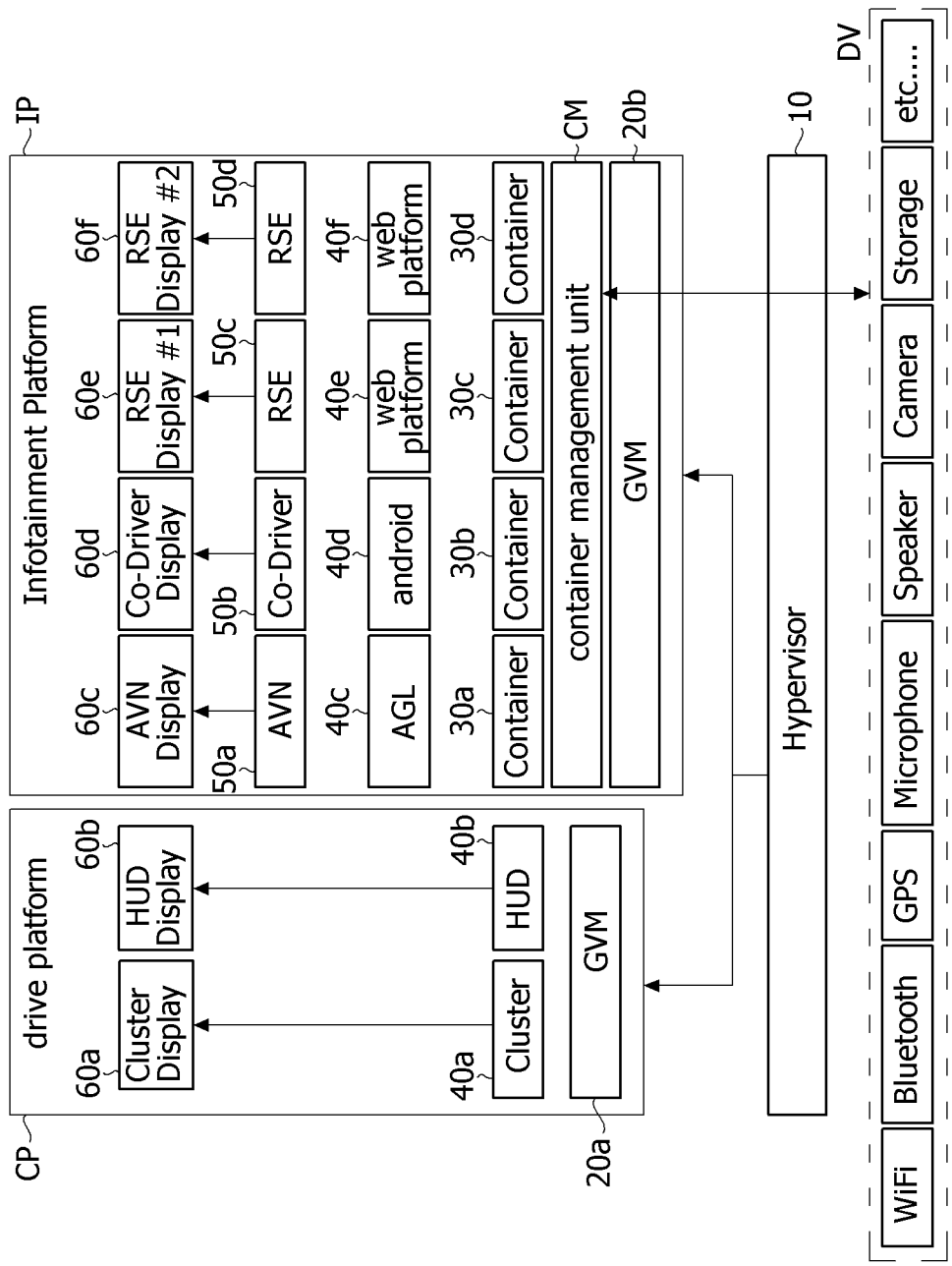
[FIG. 2]

[FIG. 3]
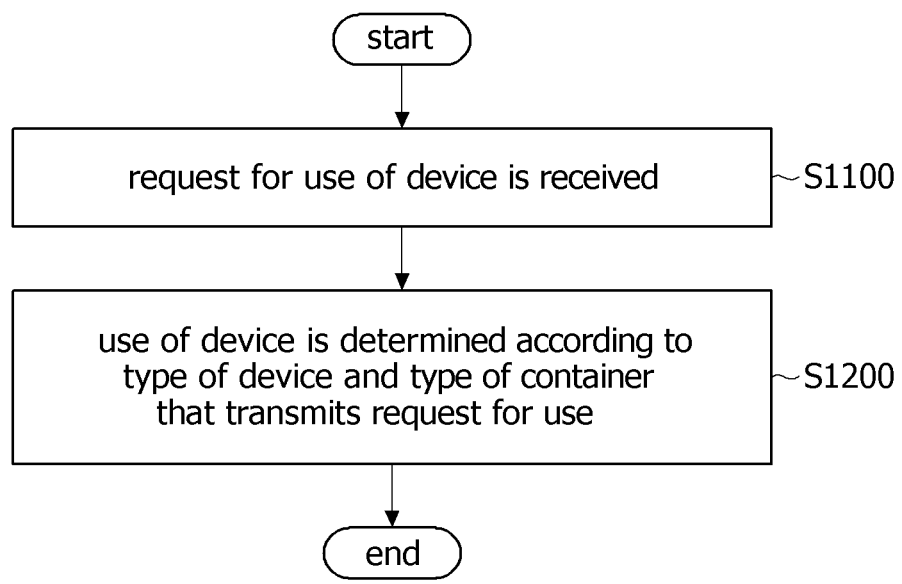

[FIG. 4]
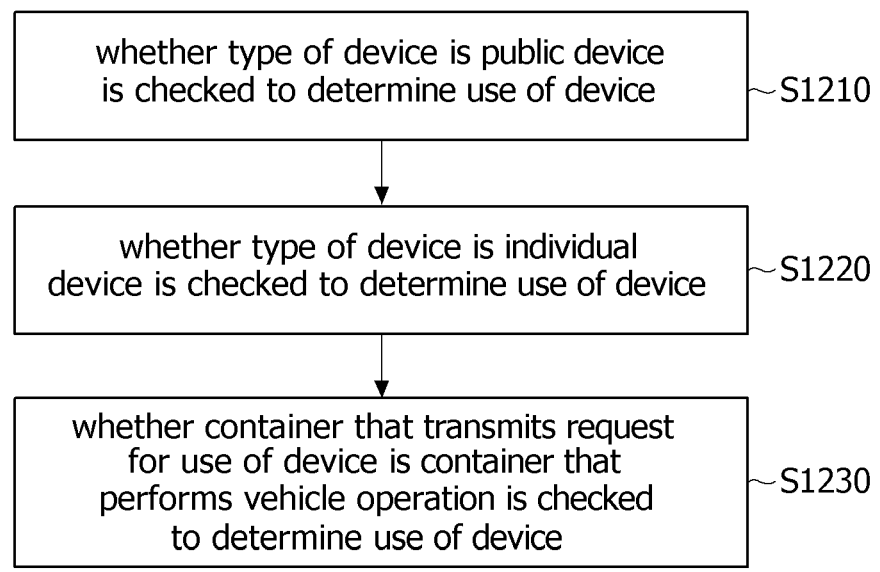

[FIG. 5]
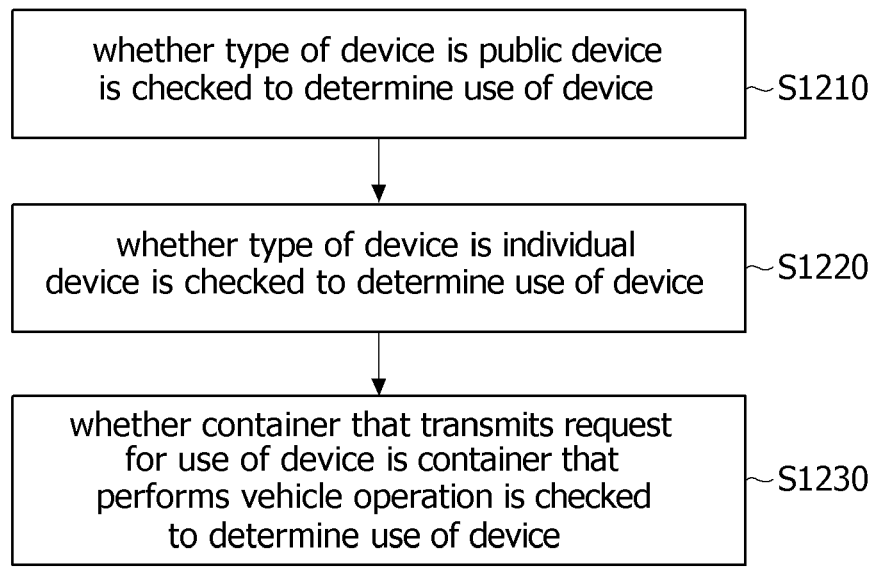

[FIG. 6]
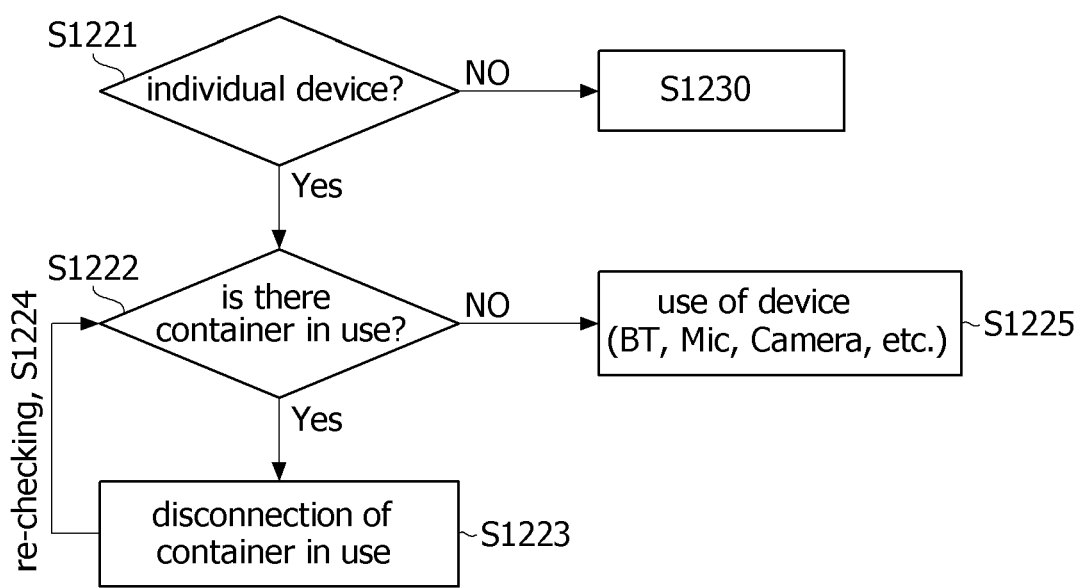

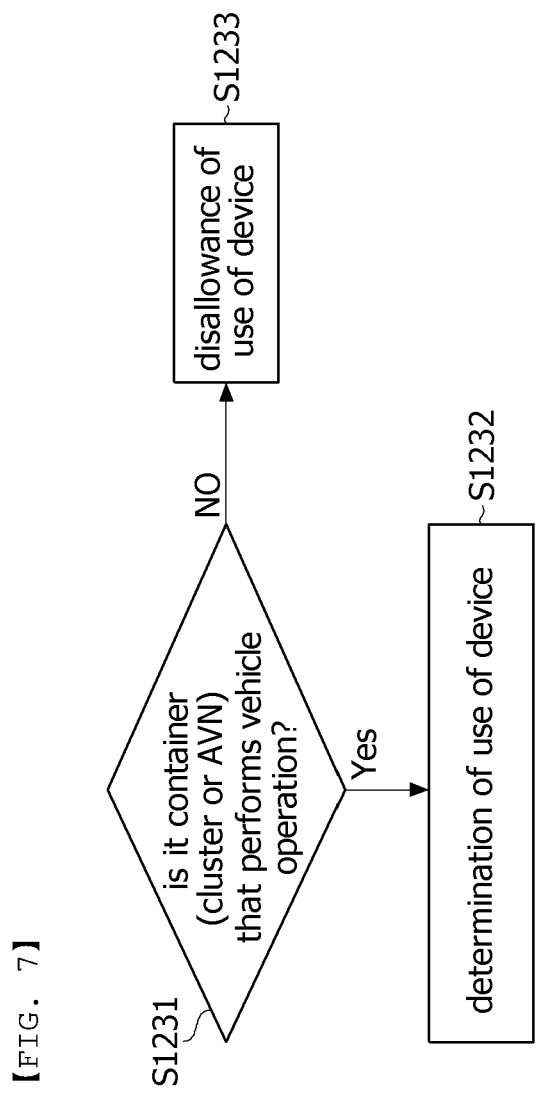
[FIG. 7]

METHOD AND DEVICE FOR CONTROLLING DEVICE BASED ON VEHICLE VIRTUAL STRUCTURE

RELATED APPLICATIONS

This application is a National Phase of PCT Patent Application No. PCT/KR2021/017039 having International filing date of Nov. 19, 2021, which claims the benefit of priority of Korean Patent Application No. 10-2021-0014175 filed on Feb. 1, 2021. The contents of the above applications are all incorporated by reference as if fully set forth herein in their entirety.

FIELD AND BACKGROUND OF THE INVENTION

An embodiment of the present invention relates to an apparatus and method for controlling a vehicle virtualization structure-based device.

Computerization in vehicles is reaching a higher level. Most of the vehicle operations, functions and tasks are currently under computer control or can be monitored by computerized devices. In other words, with the advent of the digital age, consumers can perform similar tasks to mobile phones and tablet computers, even in vehicles. For example, an in-vehicle infotainment system, which has an intelligent user interface with touch and haptic feedback, natural language voice interaction, proximity sensing, and buttons and controls, is currently in the spotlight. Thus, in-vehicle information, communication navigation, and entertainment are streamlined together and tailored to driving use.

In accordance with this technological situation, a plurality of devices exists in a vehicle, and a plurality of software for executing the devices exist. In addition, the degree of freedom in using a plurality of devices by a user or a passenger in a vehicle is increasing.

However, while a request for use of a device in a vehicle increases, there is a problem in that a standard for control processing of the device in a vehicle system according to the use of a device is ambiguous, and the risk of driving due to the device control increases.

SUMMARY OF THE INVENTION

An embodiment may provide an apparatus and method for controlling a vehicle virtualization structure-based device that can determine whether to use the device according to a type of the device and a requested container.

In addition, it is possible to provide an apparatus and method for controlling a vehicle virtualization structure-based device that is customized to a user in a vehicle.

In addition, it is possible to provide an apparatus and method for controlling a vehicle virtualization structure-based device in which driving obstruction is removed.

The object to be achieved in the embodiment is not limited thereto, and it will be said that the purpose or effect that can be grasped from the solution to the object or embodiment described below may also be included.

Solution to Problem

A method for controlling a vehicle virtualization structure-based device according to an embodiment includes the steps of receiving a request for use of a device from at least one container among a plurality of containers; and determining the use of the device according to a type of the device and a type of the container that transmits the request for use.

The step of determining may include the steps of checking whether the type of the device is a public device to determine the use of the device; and checking whether the type of the device is an individual device to determine the use of the device.

The method may further include the step of checking whether the container that transmits the request for use of the device is a container that performs vehicle operation to determine the use of the device.

The step of checking whether the type of the device is the public device to determine the use of the device may include the steps of re-checking whether the device is a network device in a public network when the type of the device is the public device; and determining a common use of the device when the device is the network device.

The step of checking whether the type of the device is a public device to determine the use of the device may include the steps of re-checking whether the type of the device is a media device in a public network when the type of the device is the public device; and determining the use of the device according to a usage policy of the device when the device is the media device.

The step of checking whether the type of the device is an individual device to determine the use of the device may include the steps of re-checking whether the device is in use when the type of the device is the individual device; and disconnecting the device that is already in use when the device is in use.

The method may further include the step of reperforming the re-checking step after the disconnecting step.

The step of re-checking may include the step of determining individual use of the device when the device is not in use.

The step of checking whether the container that transmits the request for use of the device is a container that performs vehicle operation to determine the use of the device may include the step of determining the use of the device when the container that transmits the request for use of the device is the container that performs vehicle operation.

The step of determining may include the step of determining to disallow the use of the device when the container that transmits the request for use of the device is not the container that performs vehicle operation.

An embodiment may implement an apparatus and method for controlling a vehicle virtualization structure-based device that can determine whether to use the device according to a type of the device and a requested container.

In addition, it is possible to implement an apparatus and method for controlling a vehicle virtualization structure-based device that is customized to a user in a vehicle.

In addition, it is possible to implement an apparatus and method for controlling a vehicle virtualization structure-based device in which driving obstruction is removed.

Various and beneficial advantages and effects of the present invention are not limited to the above, and will be more easily understood in the course of describing specific embodiments of the present invention.

BRIEF DESCRIPTION OF THE SEVERAL VIEWS OF THE DRAWINGS

FIG. 1 is a conceptual diagram of a vehicle virtualization structure-based system according to an embodiment.

FIG. 2 is a detailed block diagram of a vehicle virtualization structure-based system according to an embodiment.

FIG. 3 is a flowchart of a method for controlling a vehicle virtualization structure-based device according to an embodiment.

FIG. 4 is a detailed flowchart of a determination step in a method for controlling a vehicle virtualization structure-based device according to an embodiment.

FIG. 5 is a flowchart for a public device in a method for controlling a vehicle virtualization structure-based device according to an embodiment.

FIG. 6 is a flowchart for an individual device in a method for controlling a vehicle virtualization structure-based device according to an embodiment.

FIG. 7 is a flowchart for use determination when there is a request for use from a container that performs vehicle operation in a method for controlling a device based on a vehicle virtualization structure according to an embodiment.

DESCRIPTION OF SPECIFIC EMBODIMENTS OF THE INVENTION

Since the present invention may have various changes and may have various embodiments, specific embodiments will be illustrated and described in the drawings. However, this is not intended to limit the present invention to specific embodiments, and it should be understood that all modifications, equivalents and substitutes included in the spirit and scope of the present invention are included.

Terms including an ordinal number such as second, first, etc. may be used to describe various elements, but the elements are not limited by the terms. The terms are used only for the purpose of distinguishing one component from another component. For example, without departing from the scope of the present invention, the second component may be referred to as the first component, and similarly, the first component may also be referred to as the second component. The term, and/or, includes a combination of a plurality of related listed items or any of a plurality of related listed items.

When a component is referred to as being "connected" or "contacted" to another component, it should be understood that the other component may be directly connected or contacted to the other component, but other components may exist in between. On the other hand, when it is mentioned that a certain component is "directly connected" or "directly contacted" to another component, it should be understood that no other component is present in the middle.

The terms used in the present application are only used to describe specific embodiments, and are not intended to limit the present invention. The singular expression includes the plural expression unless the context clearly dictates otherwise. In the present application, terms such as "comprise" or "have" are intended to designate that a feature, number, step, operation, component, part, or combination thereof described in the specification exists, and it should be understood that this does not preclude the possibility of the presence or addition of one or more other features, numbers, steps, operations, components, parts, or combinations thereof.

Unless defined otherwise, all terms used herein, including technical or scientific terms, have the same meaning as commonly understood by one of ordinary skill in the art to which this invention belongs. Terms such as those defined in a commonly used dictionary should be interpreted as having a meaning consistent with the meaning in the context of the related art, and should not be interpreted in an ideal or excessively formal meaning unless explicitly defined in the present application.

Hereinafter, an embodiment will be described in detail with reference to the accompanying drawings, but the same or corresponding components are given the same reference numerals regardless of the reference numerals, and the overlapping description thereof will be omitted.

An embodiment of the present disclosure relates to an apparatus and method for controlling vehicle streaming for a vehicle, vehicle infotainment, etc., and provides a system environment combined with vehicle infotainment in using an application ("APP" in the same sense) in a vehicle. However, this disclosure does not limit the rights of this patent.

In more detail, a vehicle system performs an important function related to vehicle control while providing vehicle infotainment function. Here, as the functions related to vehicle control, there are an application having a navigation system that affects a user's vehicle operation, etc., a cluster system that means an instrument cluster and displays the speed or RPM of the vehicle, and an important function related to the life of occupants, such as an autonomous control system of an autonomous control vehicle. In addition, the display of this application should be performed freely, while not interfering with driving such as vehicle control. In other words, vehicle driving must be essentially secured. If this security is not provided, accidents may occur. Accordingly, in a preferred embodiment of the present invention, streaming in a vehicle is performed within a range that does not interfere with driving, so that the access and operation of vehicle occupants, including drivers, to services and applications related to entertainment such as audio reproduction, video reproduction, game playing, etc. can be facilitated.

FIG. 1 is a conceptual diagram of a vehicle virtualization structure-based system according to an embodiment, and FIG. 2 is a detailed block diagram of a vehicle virtualization structure-based system according to an embodiment.

Referring to FIGS. 1 and 2, a vehicle virtualization structure-based system according to an embodiment may include a hardware (not shown), a base operation system 10 mounted on the hardware (not shown), and a first virtual engine 20a and a second virtual engine 20b mounted on the base operation system 10, at least one operation system 30a to 30f mounted on the respective virtual engines, a plurality of operation system platforms 40a to 40f mounted on the at least one operation system 30a to 30f and being a software set including middleware and important applications, a plurality of applications 50a to 50d running on the operation system platforms 40a to 40f, a plurality of displays 60a to 60f for displaying the plurality of operation system platforms 40a to 40f or the plurality of applications, and a container management unit (CM) for managing environments for the plurality of operation systems 30a to 30d on the virtual engines 20a to 20b. The at least one operation system will be described below as a 'container'.

Here, the hardware (not shown) may be a concept including a processor, a display unit, a storage unit, a memory unit, a control unit, and an I/O device.

In an embodiment, a drive platform (CP) may be a system area mounted or running on the first virtual engine 20a, and an infotainment platform (IP) may be a system area mounted or running on the second virtual engine 20b which is different from the first virtual engine 20a. With this configuration, even if an upgrade or other malfunction occurs in the infotainment platform (IP), the drive platform (CP) may not be affected. That is, the influence while driving can be minimized. Furthermore, in addition to the infotainment platform (IP), a web platform may be mounted or running on the base operation system 10 and additional virtual engine 20. Like the infotainment platform (IP), the web platform may share the container management unit with the infotainment platform (IP). Alternatively, the web platform may be configured as a part of the infotainment platform (IP). Hereinafter, individual configurations will be described.

Like the infotainment platform (IP), the web platform may include one operation system (e.g., container, 30) mounted on the container management unit, a plurality of operation system platform (e.g., AGL, 40) mounted on the operation system and being a set of software including middleware and important applications, and a plurality of applications (e.g., web application 50) running on the operation system platform 40.

First, the base operation system 10 may be, for example, various operation systems. For example, the base operation system 10 may include Linux, hypervisor, QNX, GENIVI, and the like.

For example, the first virtual engine 20*a* and the second virtual engine 20*b* are middleware solutions or various platforms, and may be developed in mobile C language. The first virtual engine 20*a* and the second virtual engine 20*b* may provide a plurality of built-in libraries, and may perform the same operation in various mobile terminals and the like. For example, the first virtual engine 20*a* and the second virtual engine 20*b* may be Linux-based Android kernel, and may initialize memory protection, a virtual memory module, and schedule caching.

In addition, the at least one container 30*a* to 30*d* may be mounted on the second virtual engine 20*a* and not mounted on the first virtual engine 20*a*. Accordingly, since the security of the drive platform (CP) is improved, driving stability may also be improved.

The at least one container 30*a* to 30*d* may be a schedule in process virtualization as an embodiment of a virtualization method. For example, a virtualization technology using container may refer to a technology that divides the inside of a host operation system (OS) into a kernel space that manages physical resources and a user space that executes a user process, that is, an application program (application, APP), and divides the user space into several spaces to allocate and share hardware resources used in each user process. For example, the containers 30*a* to 30*d* may convert a called library be interfaced with a system library, thereby performing connection or compatibility between the base operation system and the plurality of operation system platforms.

The plurality of operation system platforms 40*a* to 40*f* may be mounted on a container. The plurality of operation system platforms 40*a* to 40*f* may include Android, Automotive Grade Linux (AGL), a web platform, a cluster platform, a head-up display (HUD) platform, and the like.

The at least one application 50*a* to 50*d* is an application program other than a system program, and is performed in audio video navigation (AVN), Co-Driver, rear seat entertainment (RSE), etc. in a vehicle, and hereinafter it will be referred to as AVN and the like.

The plurality of displays 60*a* to 60*f* may display the operation system platforms 40*a* to 40*f* or an application program on the platform to a user (e.g., a passenger). For example, the plurality of displays 60*a* to 60*f* may include various display devices (e.g., OLEDs).

The container management unit (CM) may manage environments for the plurality of operation systems 30*a* to 30*d* on the virtual engines 20*a* to 20*b*. That is, the container management unit (CM) may manage the plurality of operation systems 30*a* to 30*d*, for example, the resource allocation for containers, streaming connection, update, display output, connection with an output unit, and the like. A detailed description thereof will be provided later.

Specifically, the container management unit (CM) may include a container control unit CM1, a container upgrade unit CM2, a container state management unit CM3, a web platform container management unit CM4, and a container bridge unit CM5.

The container control unit CM1 may manage system resources allocated to containers, resource policies, streaming control related things, display output related things, file systems, and the like.

The container control unit CM1 includes a container resource management unit M1-1, a display control unit M1-2, a container policy management unit M1-3, a container file system management unit M1-4, a container streaming management unit M1-5, and an audio policy and control management unit M1-6.

The container resource management unit M1-1 may dynamically allocate the system resources allocated to containers. For example, the container resource management unit M1-1 may collect resource usage to prevent QoS performance degradation due to resource shortage. For example, the container resource management unit M1-1 may set a container to be allocated to a dedicated core by using a preset container priority, a resource usage threshold, and a monitoring period.

The container policy management unit M1-3 may include information on the priority of the aforementioned containers allocated to a dedicated core.

The display control unit M1-2 may manage the containers responsible for the operation of each of the plurality of displays to output a screen to each display in a vehicle.

The container file system management unit M1-4 may systematically and efficiently manage the files necessary for the operation of each container in a plurality of container environments. For example, the container file system management unit M1-4 may overlay a file system, for example, a container file system, with another container file system, as will be described later. Accordingly, a user (a plurality of passengers) can easily share a file system such as a container with other users or at other locations (e.g., seats).

That is, in the vehicle virtualization structure-based system according to an embodiment, a plurality of containers may share system initialization and management. For example, in the vehicle virtualization structure-based system according to an embodiment, the plurality of containers may share roots. In addition, each operation system, that is, a container stores or copies a separate change directory, so that resources such as disks can be efficiently used. Furthermore, the upgrade for each container may also be performed using only the change directory. For example, each display device can be effectively upgraded.

The container streaming management unit M1-5 may manage the movement of images output from each display, and the like. That is, the container streaming management unit M105 may determine whether streaming is possible according to the drive platform, the infotainment platform, and each display policy.

The audio policy and control management unit M1-6 may control audio output by reflecting a policy on audio output between at least one container. A detailed description thereof will be provided later.

The container upgrade unit CM2 may perform an upgrade for each operation system of the infotainment platform composed of a plurality of operation systems. For example, the container upgrade unit CM2 may easily upgrade each container of the infotainment platform composed of containers.

The container upgrade unit CM2 may include an update and check management unit M2-1 and an authentication management unit M2-2.

The update and check management unit M2-1 may check an identifier for each container requiring an update among the plurality of containers and a normal operation after the update.

The authentication management unit M2-2 may perform authentication for each vehicle and container and version comparison in order to perform the update.

The container state management unit CM3 may manage the states of the plurality of containers, such as checking whether a container operates normally.

The container state management unit CM3 may include a state management unit M3-1 and a log management unit M3-2.

The state management unit M3-1 may check whether the container and the function of the container management unit operate normally through periodic monitoring.

The log management unit M3-2 may keep a log of the content checked through the container state management unit. Furthermore, the log management unit M3-2 may delete or backup the log after a predetermined time. Furthermore, when the container operates abnormally, the state management unit M3-1 can easily solve the problem through the log management unit M3-2.

The web platform container management unit CM4 may manage the web platform container, and may include a web platform management unit M4-1 and a web account management unit M4-2.

The web platform management unit M4-1 may manage whether various functions of the web platform operate normally on an operation system, that is, a container. In addition, when a plurality of web platform containers is operated, the web platform management unit M4-1 may manage a login account for each container to manage a personalized web use environment. A detailed description thereof will be provided later.

Furthermore, the container bridge unit CM5 may be connected to an interface, hardware, etc. to perform interconnection between respective operation systems for display, audio, application, network, and the like.

The container bridge unit CM5 may include a communication channel management unit M5-1 and a device control management unit M5-2.

The communication channel management unit M5-1 may manage communication with each container 50 on the container management unit (CM).

In addition, the device control management unit M5-2 may control input/output (I/O) between each container and a device (DV). For example, a method for controlling a vehicle virtualization structure-based device, which will be described later, may be performed by the device control management unit M5-2. For example, the device control management unit M5-2 may allow a user (e.g., a passenger) to run or manipulate an application on a specific container through a user interface, etc., and may respond to a request for using an in-vehicle device such as WiFi according to the running or manipulation. That is, the device control management unit M5-2 may determine whether to use the in-vehicle device when the use of the in-vehicle device is requested from each container in the vehicle virtualization structure. In addition, the manipulation process or result may be provided to the user through an output device such as audio (e.g., a speaker). Here, the in-vehicle device may include WiFi, Bluetooth, GPS, and a microphone, a speaker, a camera, storage, and the like. Each element described in the drawings is an example, and will be described below based on this.

FIG. 3 is a flowchart of a method for controlling a vehicle virtualization structure-based device according to an embodiment, FIG. 4 is a detailed flowchart of a determination step in a method for controlling a vehicle virtualization structure-based device according to an embodiment, FIG. 5 is a flowchart for a public device in a method for controlling a vehicle virtualization structure-based device according to an embodiment, FIG. 6 is a flowchart for an individual device in a method for controlling a vehicle virtualization structure-based device according to an embodiment, FIG. 7 is a flowchart for use determination when there is a request for use from a container that performs vehicle operation in a method for controlling a device based on a vehicle virtualization structure according to an embodiment.

Referring to FIG. 3, a method for controlling a vehicle virtualization structure-based device according to an embodiment may include the steps of receiving a request for use of a device from at least one container among a plurality of containers (S1100) and determining the use of the device according to a type of the device and a type of the container that transmits the request for use (S1200). In this case, the vehicle virtualization structure-based system and device according to an embodiment may control or manage the device used for a plurality of containers. In addition, hereinafter, the method for controlling a vehicle virtualization structure-based device according to an embodiment is described such that it may be performed by the above-described container management unit, in particular, the device control management unit of the container bridge unit.

For example, a user may provide a request for use of a specific device to the above-described container bridge unit through a container by using or manipulating an application. Accordingly, the container bridge unit may receive the request for use of the device. For example, the container bridge unit may receive the request for use of the specific device through a container of AVN, RSE, or Co-drive. Hereinafter, the determination of the use of the device (permission to use) in response to the request for use will be described.

Further referring to FIGS. 4 to 6, the step of determining the use of the device according to a type of the device and a type of the container that transmits the request for use (S1200) may include the steps of checking whether the type of the device is a public device to determine the use of the device (S1210), checking whether the type of the device is an individual device to determine the use of the device (S1220), and checking whether the container that transmits the request for use of the device is a container that performs vehicle operation to determine the use of the device (S1230).

First, the container bridge unit may check whether the type of the device is a public device and then determine the use of the device based on the check result (S1210). In particular, the permission method may be different depending on whether the public device is a network device or a media device.

In addition, when the type of the device is not the public device, it may be checked whether the device is an individual device to determine the use of the device (S1220). In particular, in the case of the individual device, it may be checked whether the individual device is used in another container and then the use of the individual device may be permitted.

In addition, when the type of the device is not the public device and the individual device, it may be checked whether it is the container that performs vehicle operation to determine the use of the device (S1230).

Specifically, the step of checking whether the type of the device is the public device to determine the use of the device (S1210) may include the steps of checking whether the type of the device is the public device (S1211) and re-checking whether the type of the device is a network device in the public network (S1212).

According to an embodiment, first, it may be checked whether the device to be requested for use is the public device (S1211). If the device to be requested for use is not the public device, it may be checked whether the device is the individual device to determine the use of the device (S1220).

On the contrary, when the device to be requested for use is the public device, it may be checked whether it is a network device (S1212). In this case, when the device to be requested for use is the network device, the use of the device may be determined (S1213). Accordingly, the corresponding container can use the network device such as WiFi, LTE, and GPS. In particular, since the network device forms a network for all users, that is, all containers in the vehicle, each container can use the network. For example, GPS information may be transmitted in a broadcast manner. In addition, in the case of WiFi, it may be provided to each container through a network hub. Furthermore, human machine interaction (HMI) installation may be performed in each container. For example, the installation of human machine interaction (HMI) in a cluster or AVN can improve system stability.

In addition, when the type of the device is not the public device (a device corresponding to the public device), it may be checked whether the type of the device is the individual device to determine the use of the device (S1220).

The step of checking whether the type of device is the public device to determine the use of the device (S1210) may include the steps of re-checking whether the type of device is a media device in the public network when the type of device is the public device (S1212) and determining the use of the device according to a usage policy of the device when the device is the media device (S1214).

In addition, when the device to be requested for use is not the network device (e.g., a media device), the use of the media device may be determined (S1214). In this case, the media device may include storage, audio, and the like. Accordingly, each container may be permitted to be used according to the usage policy of the media device. For example, when a request for use of storage is received from a plurality of containers at the same time, the use of the same storage (same file) may be performed according to a preset priority. For example, the priority may be set in the order of AVN, RSE, and Co-drive. In contrast, when a request for use of storage from a plurality of containers is not for the same storage (same file), the permission for use may be made at the same time.

Furthermore, when there are requests for use of audio from a plurality of containers, an output may be mixed. However, if audio is being used by another container, mix or independent output may be performed by receiving a selection for mix or independent output.

In addition, in an embodiment, the step of checking whether the type of the device is the individual device to determine the use of the device (S1220) may include the steps of checking whether the type of the device is the individual device (S1221), when the type of the device is the individual device, re-checking whether the device is in use (S1222) and, when the device is in use, disconnecting the device that is already in use (S1223).

In addition, the method for controlling a vehicle virtualization structure-based device according to an embodiment may further include, after the step of disconnecting (S1223), the step of reperforming the re-checking step (S1224). In addition, the method for controlling a vehicle virtualization structure-based device according to an embodiment may include the step of determining individual use of the device (S1225) when the device is not in use in the step of re-checking (S1224).

In an embodiment, it may be checked whether it is the individual device (S1221), and when the device to be requested for use is not the public device and the individual device, it may be checked whether it is the container that performs vehicle operation to determine the use of the device (S1230).

On the other hand, when the device to be requested for use is the individual device, it may be checked whether there is a container in use (S1222). In this case, when there is a container in use for the individual device, the container in use may be disconnected (S1223). In this case, the disconnection may be performed without conditions according to a priority. Also, when a specific condition is satisfied according to the priority, the disconnection may be performed. For example, the priority may be set in the order of AVN, RSE, and Co-drive. In addition, when an application has a high priority or a container (in which the application is executed) is a container in use, consent to the disconnection is required. It should be understood that in this specification a request for use is described as an AVN, RSE, etc. or a container. The above-mentioned consent may be made by a user's preset input (e.g., touch). On the contrary, when an application has a low priority or a container (in which the application is executed) is a container in use, the disconnection without consent may be performed.

In addition, when the disconnection is performed, it is rechecked whether there is a container in use (S1224) and use of the device may be performed (S1225). Through this re-checking, a request for use for the same individual device is detected immediately after the container is disconnected, and thus, it is possible to prevent confusion about the use of the individual device. For example, when Bluetooth is being used in a specific container, the use of Bluetooth in another container cannot be made without the above-mentioned consent.

In addition, in an embodiment, the step of checking whether the container that transmits the request for use of the device is the container that performs vehicle operation to determine the use of the device (S1230) may include the steps of checking whether the container that transmits the request for use of the device performs the vehicle operation (S1231), and determining the use of the device when the container that transmits the request for use of the device is the container that performs the vehicle operation (S1232).

In addition, in an embodiment, the step of checking whether the container that transmits the request for use of the device is the container that performs vehicle operation to determine the use of the device (S1230) may include the steps of checking whether the container that transmits the request for use of the device is the container that performs vehicle operation (S1231), and determining to disallow the use of the device when the container that transmits the request for use of the device is not the container that performs the vehicle operation (S1233). According to this configuration, it is possible to determine the use of the device from the container (cluster or AVN) that performs the vehicle operation, thereby minimizing driving obstruction.

The above-described embodiment of the present invention may also be implemented in the form of a recording medium including instructions executable by a computer, such as a program module executed by a computer. A computer-readable media can be any available media that can be accessed by a computer and includes both volatile and nonvolatile media, removable and non-removable media. Also, the computer-readable media may include computer storage media. The computer storage media may include both volatile and nonvolatile media and both removable and non-removable media that are implemented in any method or technology for storing information such as computer readable instructions, data structures, program modules or other data.

In an embodiment, the control unit may include a processor and a memory. In addition, the processor may perform various functions by executing computer-executable instructions (modules) stored in the memory.

According to an embodiment, the processor may perform each step or function of the above-described method for controlling a virtualization structure-based device by executing computer executable instructions stored in the memory.

In addition, various embodiments of the present disclosure may be implemented as software including instructions that may be stored in a machine-readable storage medium (e.g., a computer). A machine may be a device capable of reading a stored command from a storage medium and operating according to the read command.

In addition, when such instructions are executed by a processor, the processor may perform a function corresponding to the instructions by using other components directly or under the control of the processor. The instructions may include code generated or executed by a compiler or interpreter. For example, the above-described control method may be executed by executing the instructions stored in the storage medium by the processor.

In addition, the device-readable storage medium may be provided in the form of a non-transitory storage medium. Here, the 'non-transitory' means that the storage medium does not include a signal and is tangible, and does not distinguish whether data is semi-permanently or temporarily stored in the storage medium.

According to an embodiment, the method according to various embodiments disclosed in this document may be provided as in a computer program product. The computer program product may be traded between a seller and a buyer as a commodity. The computer program product may be distributed in the form of a device-readable storage medium (e.g., compact disc read only memory (CD-ROM)) or online through an application store (e.g., Play Store, APP Store). In the case of online distribution, at least a part of the computer program product may be temporarily stored or temporarily generated in a storage medium such as a memory of a server of a manufacturer, a server of APP store, or a relay server.

In addition, the apparatus and method for controlling a vehicle virtualization structure-based device as described in the present embodiment may be implemented as a computer program stored in a computer-implementable storage medium. In addition, the term '-unit' used in the embodiment means software or hardware components such as field-programmable gate array (FPGA) or ASIC, and the term '-unit' may perform certain roles. However, the term '-unit' is not limited to software or hardware. The term '-unit' may be configured to reside in an addressable storage medium or may be configured to reproduce one or more processors. Thus, as an example, the term '-unit' denotes components such as software components, object-oriented software components, class components, and task components, processes, functions, properties, and procedures, subroutines, segments of program code, drivers, firmware, microcode, circuitry, data, databases, data structures, tables, arrays, and variables. The functions provided in the components and '-unit' may be combined with a smaller number of components and '-units' or may be further separated into additional components and '-units'. In addition, components and '-units' may be implemented to reproduce one or more CPUs in a device or secure multimedia card.

As described, embodiments have been mainly described, but these are only examples and do not limit the present invention, and those of ordinary skill in the art to which the present invention pertains will appreciate that various modifications and applications not exemplified above are possible without departing from the essential characteristics of the present embodiments. For example, each component specifically shown in the embodiments can be implemented by modification. In addition, the differences related to these modifications and applications should be construed as being included in the scope of the present invention defined in the appended claims.

The invention claimed is:

1. A method for controlling a vehicle virtualization structure-based device comprising the steps of:
   receiving a request for use of a device from at least one container among a plurality of containers; and
   determining the use of the device according to a type of the device and a type of the container that transmits the request for use.

2. The method for controlling a vehicle virtualization structure-based device according to claim 1, wherein the step of determining comprises the steps of:
   checking whether the type of the device is a public device to determine the use of the device; and
   checking whether the type of the device is an individual device to determine the use of the device.

3. The method for controlling a vehicle virtualization structure-based device according to claim 2, further comprising the step of checking whether the container that transmits the request for use of the device is a container that performs vehicle operation to determine the use of the device.

4. The method for controlling a vehicle virtualization structure-based device according to claim 3, wherein the step of checking whether the container that transmits the request for use of the device is a container that performs vehicle operation to determine the use of the device comprises the step of determining the use of the device when the container that transmits the request for use of the device is the container that performs vehicle operation.

5. The method for controlling a vehicle virtualization structure-based device according to claim 4, wherein the step of determining comprises the step of determining to disallow the use of the device when the container that transmits the request for use of the device is not the container that performs vehicle operation.

6. The method for controlling a vehicle virtualization structure-based device according to claim 2, wherein the step of checking whether the type of the device is the public device to determine the use of the device comprises the steps of:

re-checking whether the device is a network device in a public network when the type of the device is the public device; and determining a common use of the device when the device is the network device.

7. The method for controlling a vehicle virtualization structure-based device according to claim 2, wherein the step of checking whether the type of the device is a public device to determine the use of the device comprises the steps of:

re-checking whether the type of the device is a media device in a public network when the type of the device is the public device; and determining the use of the device according to a usage policy of the device when the device is the media device.

8. The method for controlling a vehicle virtualization structure-based device according to claim 2, wherein the step of checking whether the type of the device is an individual device to determine the use of the device comprises the steps of:

re-checking whether the device is in use when the type of the device is the individual device; and disconnecting the device that is already in use when the device is in use.

9. The method for controlling a vehicle virtualization structure-based device according to claim 8, further comprising the step of reperforming the re-checking step after the disconnecting step.

10. The method for controlling a vehicle virtualization structure-based device according to claim 8, wherein the step of re-checking comprises the step of determining individual use of the device when the device is not in use.

* * * * *